United States Patent
Mahoney et al.

(10) Patent No.: US 6,957,755 B2
(45) Date of Patent: Oct. 25, 2005

(54) ELECTRONIC TOLL COLLECTION TAG HOLDER FOR A MOTORCYCLE

(76) Inventors: Robert H. Mahoney, 822 Post Ave., Staten Island, NY (US) 10310; Kevin J. Tuminski, 59 Malone Ave., Staten Island, NY (US) 10306

(*) Notice: Subject to any disclaimer, the term of this patent is extended or adjusted under 35 U.S.C. 154(b) by 0 days.

(21) Appl. No.: 10/090,658

(22) Filed: Mar. 5, 2002

(65) Prior Publication Data

US 2003/0168485 A1 Sep. 11, 2003

(51) Int. Cl.⁷ .................................. B62J 11/00
(52) U.S. Cl. ............ 224/413; 224/277; 224/420; 224/433; 224/435; 224/440; 224/929
(58) Field of Search ................. 224/277, 413, 224/420, 433, 435, 440, 448, 459, 929; 40/643; 340/693.6, 904

(56) References Cited

U.S. PATENT DOCUMENTS

| | | | |
|---|---|---|---|
| 1,440,061 A | * 12/1922 | Connolly | 224/277 |
| 2,640,596 A | * 6/1953 | Reeder | 224/277 |
| 3,313,053 A | * 4/1967 | Vogeli Sr. | 40/643 |
| 3,598,295 A | * 8/1971 | Seegers | 224/929 |
| 4,800,664 A | * 1/1989 | Marstall | 224/435 |
| 4,881,654 A | * 11/1989 | Stazo et al. | 224/181 |
| 5,069,376 A | * 12/1991 | Barel | 224/277 |
| 5,593,075 A | * 1/1997 | Schumer | 224/277 |
| 5,850,957 A | * 12/1998 | Morris | 224/277 |
| 5,881,936 A | * 3/1999 | Li | 224/413 |
| 5,960,572 A | * 10/1999 | DeVito | 248/206.3 |
| 5,979,097 A | * 11/1999 | Moore | 40/769 |
| 6,127,938 A | * 10/2000 | Friedman | 340/904 |
| 6,390,429 B1 | * 5/2002 | Brincat | 224/420 |

* cited by examiner

Primary Examiner—Gary E. Elkins
(74) Attorney, Agent, or Firm—Salvatore J. Maiorino

(57) ABSTRACT

An ETC tag holder for motorcycles is provided. A securing case comprises a back panel with a bottom surface extending outwardly at a substantially right angle. A receptacle wall extending upwardly from the outer edges of the bottom surface, and along its length, connect with the back panel to form a hollow receptacle for removably receiving an ETC tag. The case is mounted onto a motorcycle by an engaging portion that securedly engages the back panel and a clamping portion for clamping onto a cylindrical part of a motorcycle.

20 Claims, 7 Drawing Sheets

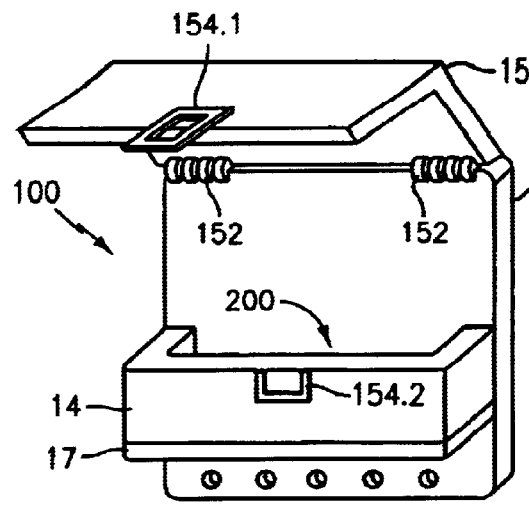
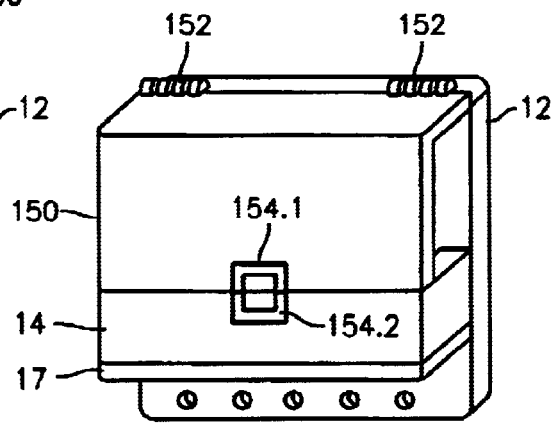
FIG. 15(a)　　　　　　　FIG. 15(b)
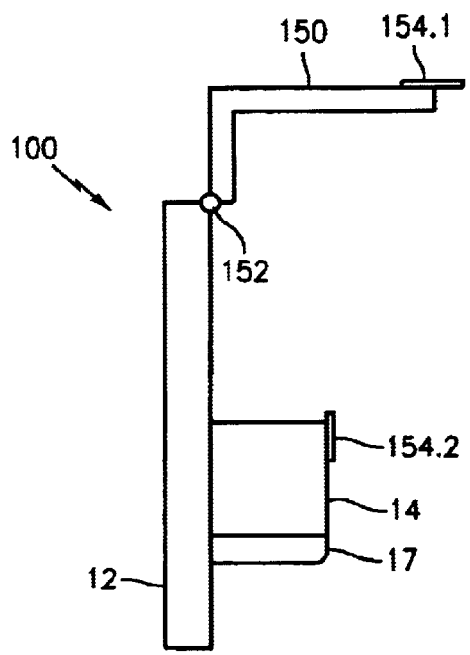
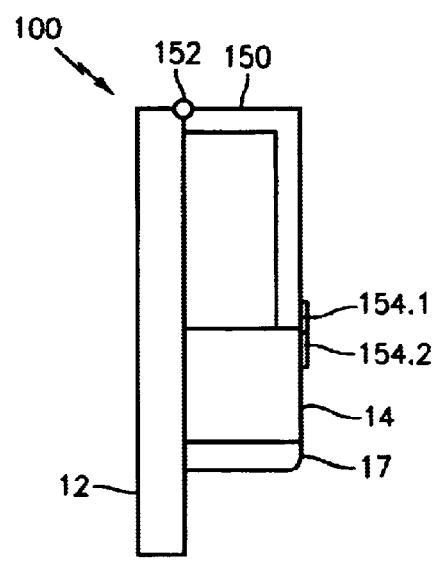
FIG. 16(a)　　　　　　　FIG. 16(b)

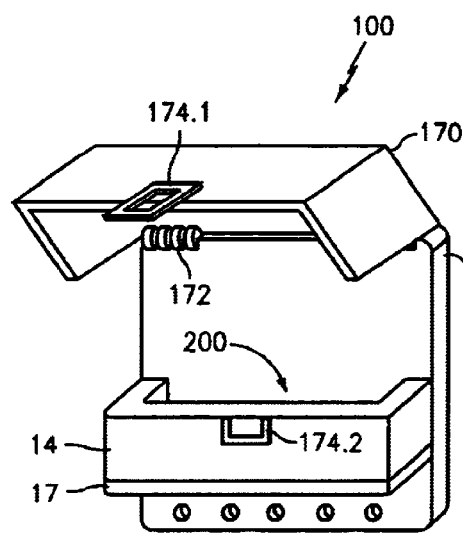
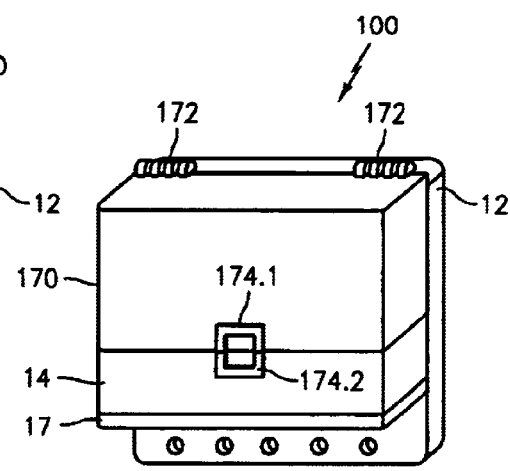
FIG. 17(a)  FIG. 17(b)
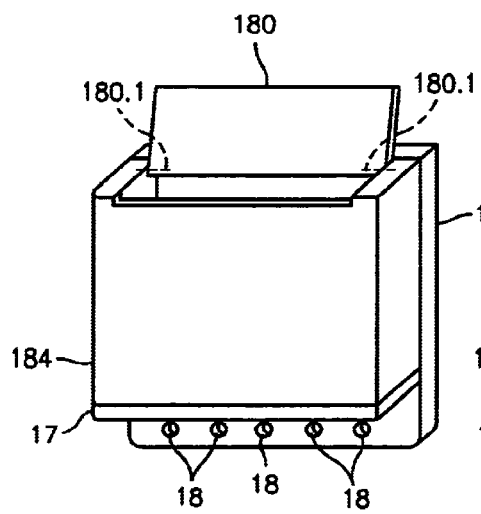
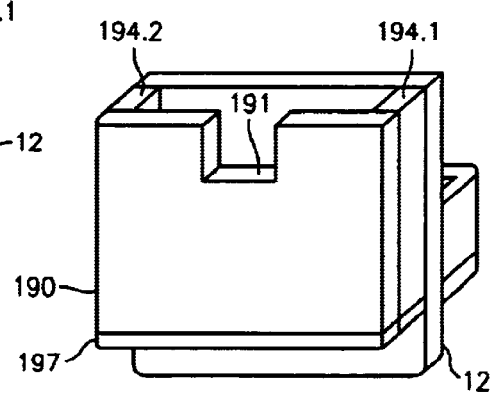
FIG. 18  FIG. 19

ELECTRONIC TOLL COLLECTION TAG HOLDER FOR A MOTORCYCLE

BACKGROUND

With electronic toll collection (ETC) systems, motorists can pay for bridge and highway tolls without the traditional cash exchange. A motorist sets up a debit account from which toll payment is deducted. The debit account is funded either by check at the discretion of the motorist, or automatically by credit card each time the debit account reaches a minimum threshold. Once the account is set up, the motorist receives an electronic tag that corresponds to his payment information. The toll booths of the ETC system have a receiving antenna that detects the tag and sends its information (payer identification, account information and method of payment) to a central billing system to deduct the toll amount from the motorist's corresponding account. For the antenna to read the tag, it must be within a certain reading zone (usually the middle of the toll lane within a certain height range). ETC systems are more convenient than traditional cash based systems providing faster service and shorter lines at toll booths. It is expected that eventually, ETC systems will replace cash-based toll collection entirely.

Motorcycle operators have problems using ETC systems for lack of a suitable place to mount the tag, and therefore, cannot enjoy the benefits of an ETC system. In automobiles, the tags are usually fixed to the inside of the windshield. Such a mounting arrangement on a motorcycle, however, is not practical. At highway speeds, wind resistance creates violent turbulence that rips the tag off the windshield. Mounting surfaces are not available as most of the exposed surfaces on motorcycles are functional components (i.e., gas tank, oil reservoir, suspension components) that cannot be drilled or otherwise altered to hold or secure the ETC tag.

Typically, a motorcycle driver has to come to a complete stop at an ETC toll booth, remove the tag, usually from a pocket or bag, and search for the proper reading zone before they can continue passed the toll. This usually takes longer than the traditional cash exchange. As a result, ETC systems are an inconvenience to motorcycle operators and there is a need for an ETC tag holder that can attach to a motorcycle without interfering with the operation of the motorcycle and the reading of the ETC tag.

SUMMARY OF THE INVENTION

A ETC tag holder according to an embodiment of the present invention comprises an open-top, hollow body of sufficient size to accommodate an ETC tag therein. When an ETC tag is inserted into the hollow body, the tag projects upwardly, out of the body. The hollow body has a bottom surface for receiving the bottom of an inserted ETC tag. Means for securing the ETC tag as well with means for adjustably mounting the hollow body on a motorcycle.

BRIEF DESCRIPTION OF THE DRAWING

FIGS. 15(a)–15(b) show an ETC tag securing case according to an embodiment of the present invention with a lid.

FIGS. 16(a)–16(b) depict a side view of the case in 15(a)–15(b).

FIGS. 17(a)–17(b) show an alternative embodiment of the case in FIGS. 15(a)–15(b).

FIG. 18 shows an ETC tag securing case according to another alternative embodiment of the present invention with a lid.

FIG. 19 depicts a back view of an ETC tag securing case with an alternative embodiment of a document holder with a finger slot.

DETAILED DESCRIPTION

Figure 1:
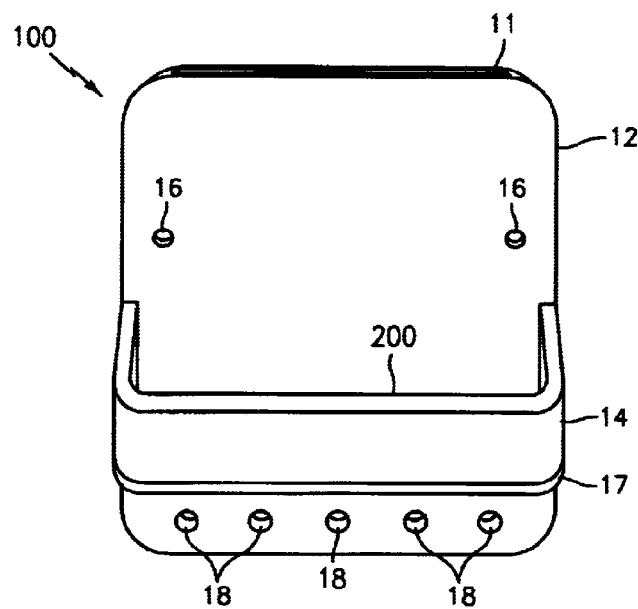
FIG. 1 shows a securing case for an ETC tag holder according to an embodiment of the present invention.

FIG. 1 shows a securing case for an ETC tag holder in accordance with a preferred embodiment of the present invention. A securing case generally indicated by reference numeral 100, preferably made of plastic, comprises a back panel 12 with a bottom surface 17 extending outwardly from the panel 12 at a substantially right angle. A receptacle wall 14 extends upwardly from the outer edge of the bottom surface 17 along its outer edge length so that the back edges of the receptacle wall 14 connect to the front of the panel 12 to define an open-top, hollow receptacle 200 for receiving an ETC tag (not shown). Tag securing holes 16 in the panel 12, that extend from front to back, may be provided for receiving an elastic band (not shown) that wraps around an inserted tag, securing it in the receptacle 14. Preferably, the tag securing holes are placed above the receptacle wall 14 and at the sides of the panel 12. A portion of the panel's 12 lower end extends below the bottom surface where a plurality of mounting holes 18 are disposed along its width. The number of holes provided is a design choice and are preferably spaced evenly apart to implement a number of mounting configurations, thereby accommodating a variety of handlebar shapes, sizes and rake angles (the angles at which a bar bends in relation to other portions of the bar).

The case 100 is preferably made of plastic to avoid interference between the receiving antenna and the tag. The conductive properties of metals have been found to interfere with the signal produced by ETC tags, preventing the receiving antenna from reading the tag properly. The pieces of the case, namely, the back panel 12, the receptacle wall 14 and the bottom surface 17, may be attached to each other by an adhesive, such as glue or an epoxy resin. In addition, a document holder in the form of a downward, slot-shaped cavity 11 may be provided in the panel 12 to hold and secure documents and papers such as registration cards, insurance cards, licenses or any other documentation that may be necessary to operate a motorcycle.

Figures 2, 3:
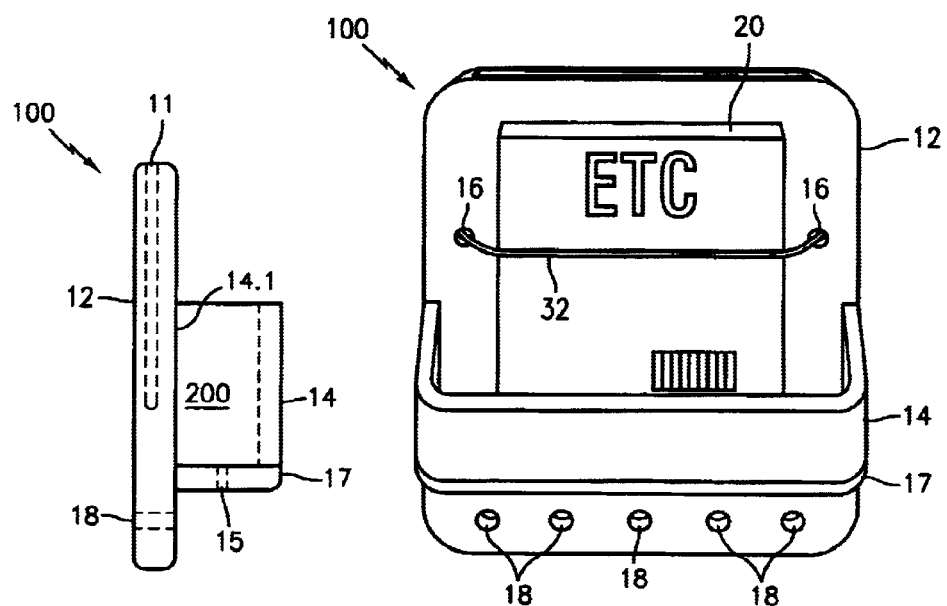
FIG. 2 shows a side view of the case in FIG. 1.
FIG. 3 shows the case of FIG. 1 with an ETC tag inserted therein and secured by an elastic band.

FIG. 2 shows a side view of the securing case 100 of FIG. 1 with similar components bearing similar reference numerals. As previously described with reference to FIG. 1, in FIG. 2 a back panel 12 has a bottom surface 17 extending outwardly from the panel 12 at a substantially right angle. A receptacle wall 14 extends upwardly from the bottom surface 17 along its length so that the back edge 14.1 of the receptacle wall 14 is connected to the front of the panel 12. A portion of the panel extends below the bottom surface 17 where mounting holes 18 are provided. The slot-shaped cavity 11 is indicated by a dashed line inside the panel 12. In addition, drainage holes 15 are provided in the bottom surface 17 to drain any fluids that may collect in the receptacle's bottom from sources such as rain or accidentally spilled beverages.

FIG. 3 shows an ETC tag 20 in the securing case 100 with similar components bearing similar reference numerals as previous figures. The tag 20 is secured by an elastic band 32 passing through the holes 16 in the back panel 12. The elastic band 32 may be attached to the back side of the panel, through the holes 16 by any suitable attaching means such as glue, staples, or a knot in the band large enough to prevent the ends from slipping through the hole.

Figure 4:
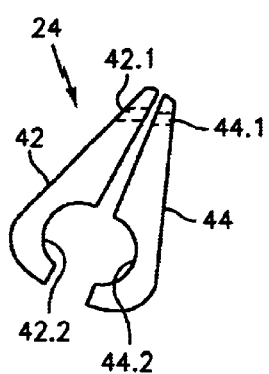
FIG. 4 depicts an exemplary means for mounting the case of FIGS. 1–3 according to an embodiment of the present invention.
Figure 5:
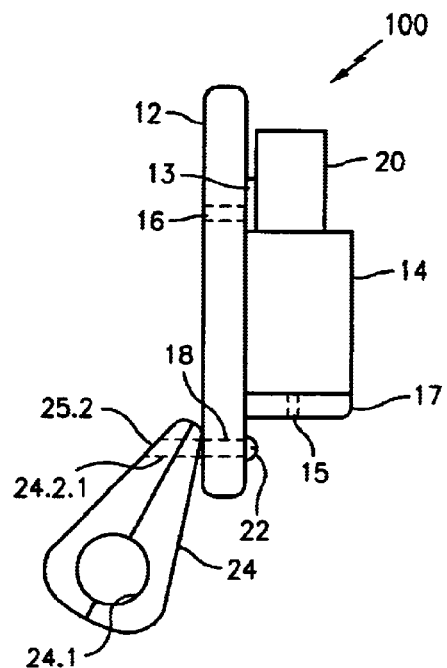
FIG. 5 shows the case of FIG. 1 secured to the means for mounting of FIG. 4.

FIG. 4 depicts an exemplary means for mounting the case of FIGS. 1–3 onto a motorcycle. The means for mounting, generally indicated by reference numeral 24 comprises a left half 42 and a right half 44 to be placed around a cylindrical member part of a motorcycle, such as a handlebar. Each side has an engaging portion 42.1 and 44.1, and a clamping portion 42.2 and 44.2. The engaging portions 42.1 and 44.1 are constructed and arranged to accept a bolting element (not shown) that joins and holds the two halves 42 and 44 together when mounted on a motorcycle. The clamping portions 42.2 and 44.2 are designed to clamp onto a cylindrical motorcycle part when the two halves 42 and 44 are joined together by a bolting element FIG. 5 shows a side view of the case 100 secured to means for mounting 24 with an engaging portion 24.2 and a clamping portion 24.1. A bolting element 22, such as a nut and bolt, screw, or rivet, passes through mounting hole 18 and an engaging hole 24.2.1 in the engaging portion 24.2 of the mounting means 24. The engaging hole 24.2.1 is preferably threaded for attachably receiving the bolting element 22 which securedly joins the two halves (42 and 44 from FIG. 4) of the means for mounting. More than one bolting element 22 and means for mounting 24 may be used in conjunction with any number and combination of the mounting holes 18. An ETC tag 20 is inserted into the hollow receptacle of the case 100 and, in this example, secured to the panel 12 by tag securing means 13 which may be double-sided adhesive tape or velcro tape as an alternative to the elastic band 32 shown in FIG. 3.

Figure 6:
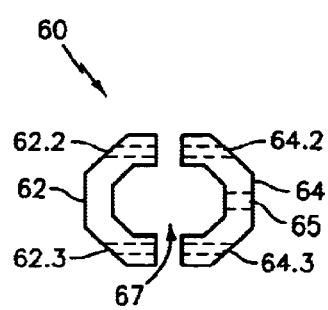
FIG. 6 shows an alternative embodiment of the means for mounting in FIG. 4.

FIG. 6 shows an alternative embodiment of the means for mounting, generally indicated by reference numeral 60. Two halves 62 and 64 are joined over a cylindrical motorcycle member (not shown) and secured by a first bolting element (not shown) passing through a threaded hole 62.2 and 64.2 in the upper end of each half and a second bolting element (not shown) passing through a threaded hole 64.3 and 62.3 in the lower end of each half. The interior of each half 62 and 64 defines the clamping portion 67. The right half 64 has an engaging portion 65 for receiving a third bolting element 22 that passes through the mounting holes of a case to secure the case to the means 60, as depicted in FIG. 7.

Figure 7:
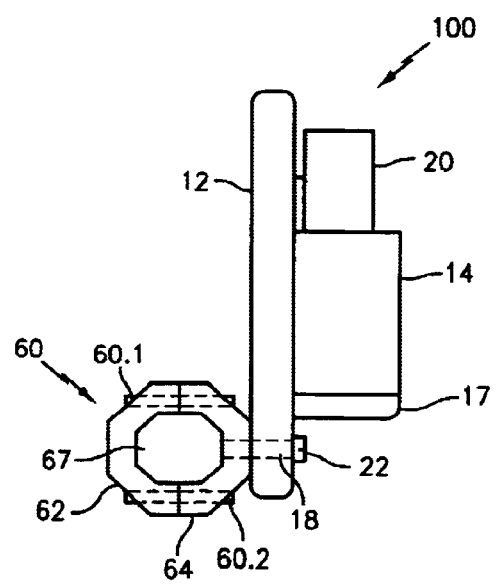
FIG. 7 depicts the means for mounting of FIG. 6 secured to the case of FIGS. 1–3.

Referring now to FIG. 7, a case 100 holds a tag 20 as previously described with similar components bearing similar reference numerals. The clamping portion 67 clamps around a motorcycle handlebar, for example, when the two halves 62 and 64 are securely joined by first bolting element 60.1 and second bolting element 60.2. The third bolting element 22 secures the case 100 to the mounting means 60.

Figure 8:
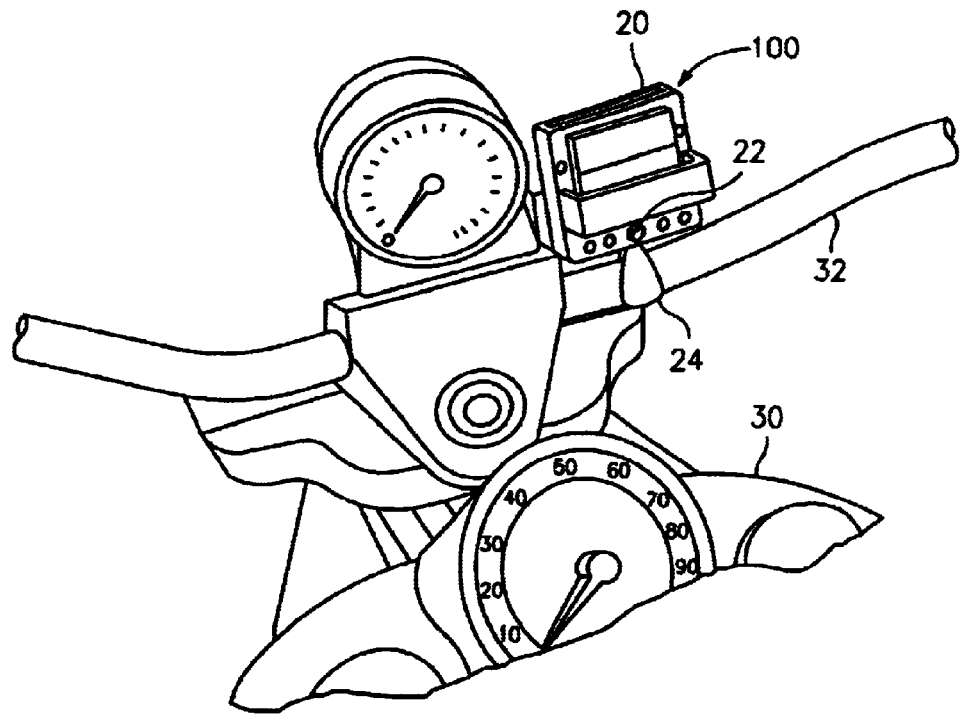
FIG. 8 shows the case of FIG. 3 mounted on the handlebars of a motorcycle.

Referring to FIG. 8, the securing case 100 is shown attached to a motorcycle 30, again similar components bearing similar reference numerals as in previous figures. The means for mounting 24 are clamped onto the handlebar 32. The bottom of the back panel 12 is secured to the clamp 24 by a bolting element 22 passing through a mounting hole in the panel and the engaging portion of the mounting means as depicted in FIG. 5. The tag 20 is placed in the hollow receptacle of the securing case 100 and may be secured by the double-sided tapes of FIG. 5 or the elastic band shown in FIG. 3.

Figure 9:
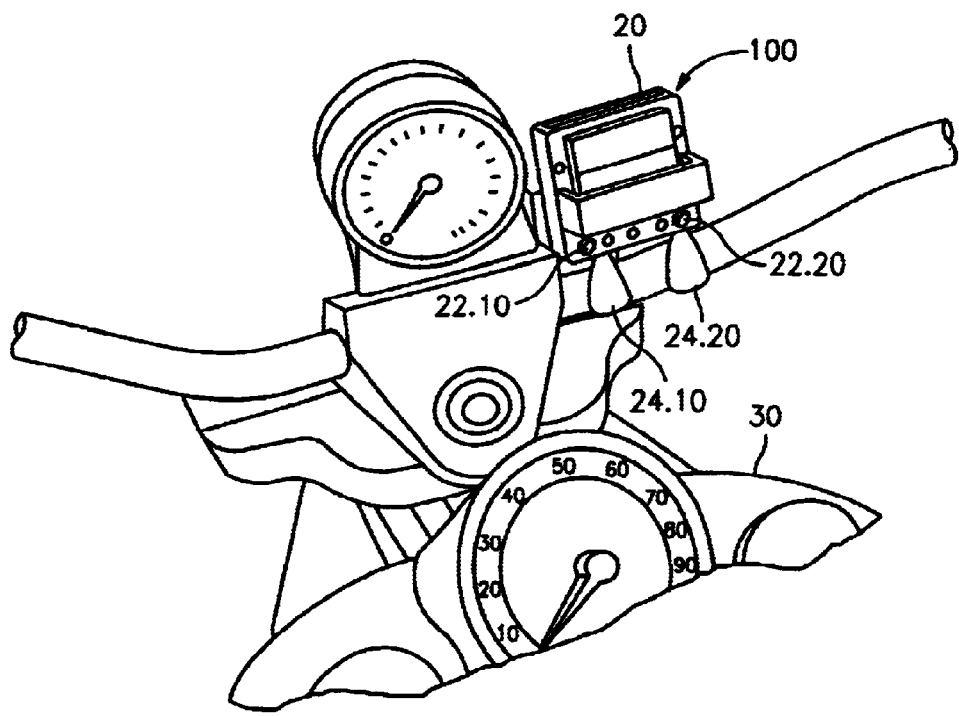
FIG. 9 shows an alternative mounting configuration for the securing case of FIG. 8.
Figure 10:
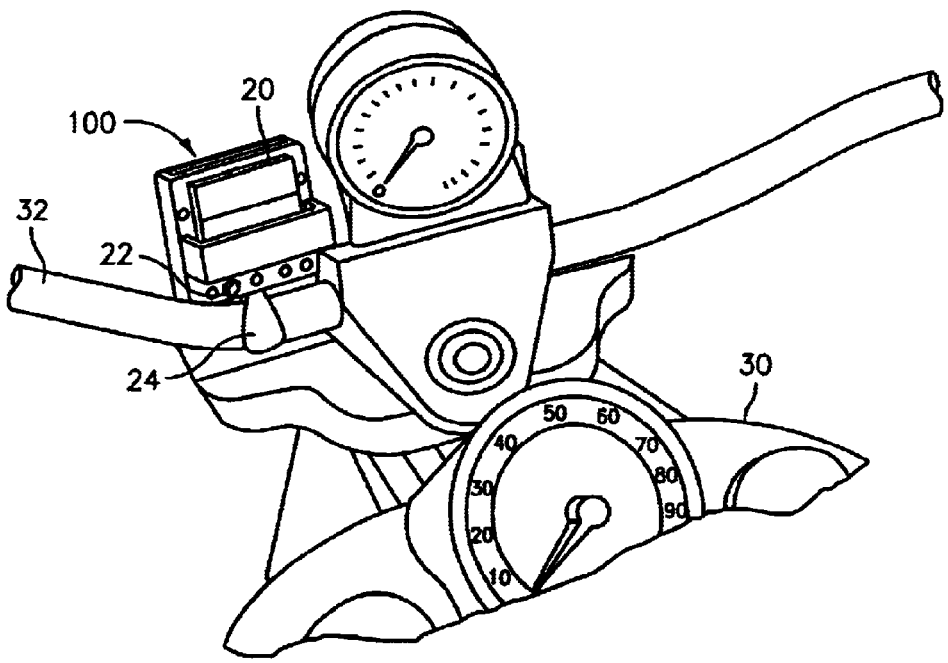
FIG. 10 shows another alternative mounting configuration for the case of FIG. 8.

The securing case may be mounted by any number of mounting means up to the number of mounting holes provided in the panel. For example, if five mounting holes are available, up to five different mounting means may be used, depending on the handlebar space available. In addition, any combination of mounting holes may be used. FIG. 9 shows a mounting configuration for the securing case 100 with an ETC tag 20 and two sets of mounting means at opposite ends of the back panel 12. The first set 24.10 is secured to the back panel 12 by bolting element 22.10 passing through the mounting hole on the far left of the back panel 12 and engaging the engaging portion of the mounting means 24.10, as previously discussed. The second set 24.20 is secured to the panel 12 by a second bolting element 22.20. FIG. 10 shows a mounting configuration with one set of mounting means 24 and one bolting element 22 secured to the back panel 12 through a mounting hole that is off-center. This configuration works where there is insufficient horizontal space on a handlebar to accommodate more than one mounting means.

Figure 11:
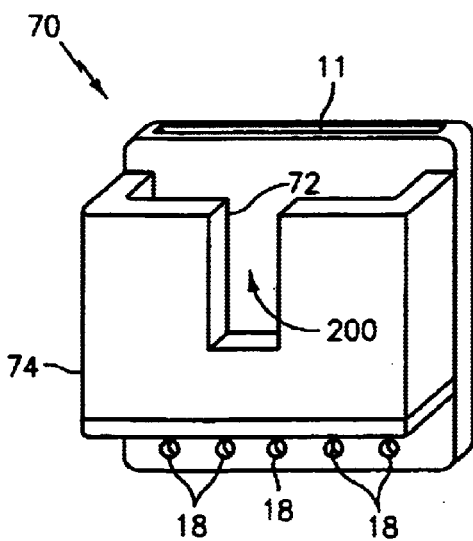
FIG. 11 shows a securing case for an ETC tag holder according to an alternative embodiment of the present invention with a finger slot.

FIG. 11 shows a securing case according to an alternative embodiment of the present invention generally indicated by reference numeral 70 where the receptacle wall 74 has a finger slot 72 extending into the hollow receptacle 200 so that a finger can get into the hollow receptacle 200 to easily remove an ETC tag (not shown) contained therein. The receptacle wall should extend virtually all the way to the top of the panel 12 to ensure that a received tag is secure. An elastic band (not shown) may be used for added stability in securing the tag by wrapping the band around the case 70 in a vertical direction.

Figure 12:
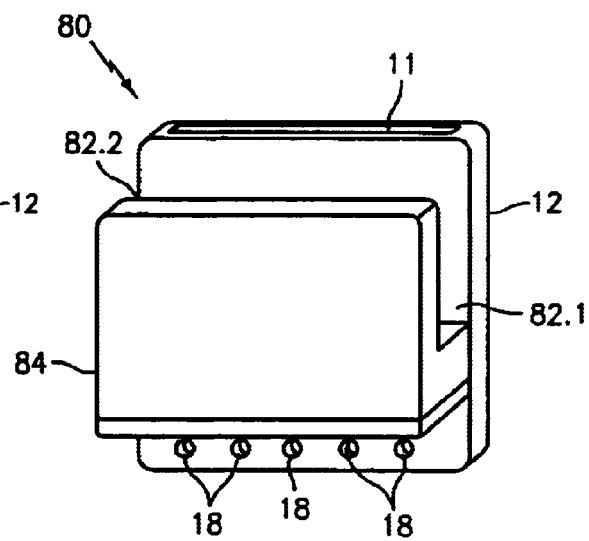
FIG. 12 shows a securing case for an ETC tag holder according to another alternative embodiment of the present invention with more than one finger slot.

FIG. 12 shows another alternative embodiment of the securing case generally indicated by reference numeral 80 where one finger slot 82.2 is provided on the left of the receptacle wall 84 and another slot 82.1 on the right of the receptacle wall 84. With this embodiment, fingers can grasp an ETC tag (not shown) by its sides to be upwardly removed by placing one finger through the left finger slot 82.2, and another finger through the right finger slot 82.1.

Figures 13, 14A:
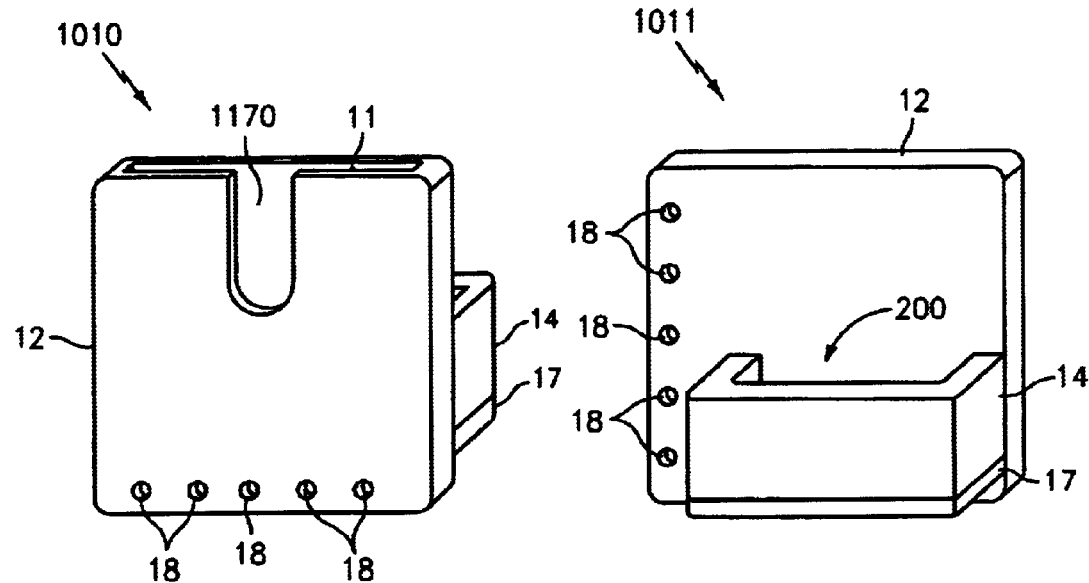
FIG. 13 shows a securing case for an ETC tag according to an embodiment of the present invention, from the back, with a finger slot provided in the back panel.
FIGS. 14(a)–14(b) show alternative embodiments of a securing case for the ETC tag holder of the present invention where mounting apertures are provided on the side and top of the back panel.

FIG. 13 depicts an ETC tag holder 1010 from the back. In this particular embodiment, a finger slot 1170 is provided in the back panel 12 extending into the document holder cavity 11. With the slot 1170, it is easier to remove any documents such as registration or insurance cards, from the cavity 11 that may be contained therein.

Figure 14B:
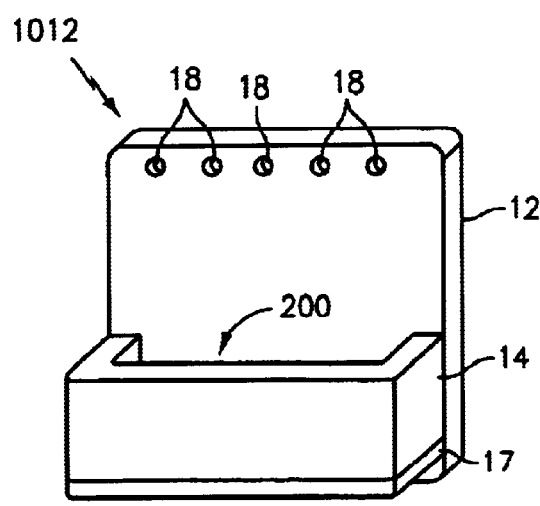

FIGS. 14(a) and 14(b) show other embodiments of the invention where the mounting holes 18 are disposed along different sides of the panel 12. In FIG. 14(a), a portion of the left side of the panel 12 extends beyond the receptacle wall 14. The mounting holes 18 are provided in the portion that extends beyond the wall 14 on the left side of the panel 12. The receptacle wall 14 and bottom surface 17 are positioned so that the hollow receptacle is open on top to receive an ETC tag. In FIG. 14(b), the bottom surface 17 and receptacle wall 14 are moved toward the lower end of the panel 12 and the mounting holes 18 are disposed along the top of the panel 12.

FIG. 15(a) shows yet another alternative embodiment of the present invention with a securing lid 150. The securing case 100 of the previous embodiments is attached to a lid 150 by hinges 152 at the top of the back panel 12. Means for fastening the lid 150, such as a male clasp 154.1 integrated into the lid 150 for a female clasp 154.2 on the receptacle wall 14, may be provided. An ETC tag (not shown) is placed in the hollow receptacle 200 and secured by closing the lid 150 and securing the male clasp 154.1 on the female clasp 154.2. FIG. 15(b) shows the case of FIG. 15(a) in a closed configuration with similar elements bearing similar reference numerals.

FIGS. 16(a) and 16(b) show a side view of the case in FIGS. 15(a) and 15(b) with similar elements bearing similar reference numerals.

FIG. 17(a) shows an alternative embodiment for the lid of FIG. 15(a) with similar elements bearing similar reference numerals. As previously described, a securing case 100 comprises the back panel 12, receptacle wall 14, and bottom surface 17 interconnected to form a hollow receptacle 200 for removably receiving an ETC tag. A lid 170, shaped to enclose substantially all of the hollow receptacle portion, is attached to the top of the panel 12 by hinges 172. Means for fastening the lid 170, such as a male clasp 174.,1 is provided in the lid 170 to engage a female clasp 174.2 on the receptacle wall 14, to hold the lid 170 in a closed position against the receptacle wall 14 as shown in FIG. 17(b). In the closed position of FIG. 17(b), the case 100 is a completely enclosed box.

FIG. 18 shows another alternative embodiment of the lid in previous FIGS. 15(a)–17(b). In this particular embodiment, the receptacle wall 184 extends virtually all the way to the top of the back panel 12. A lid 180 is substantially flat and shaped to fit onto the top of the receptacle wall 184 when closed. The lid 180 is fixed to the case 70 at the top of the panel 12 by pins 180.1. Although not shown, the lid may be secured to the receptacle wall 74 by a clasp, velcro, or any other suitable fastening means.

FIG. 19 shows another alternative embodiment of the present invention where the back panel 12 has a left sidewall 194, a right sidewall 194.1 and a second bottom surface 197 attached to its backside. A second panel 190 is attached to the sidewalls 194.1 and 194.2 and the bottom surface 197 to form a receptacle for a document holder. The second panel 190 preferably has a finger slot for easy removal of contents. This embodiment may be used as an alternative to the cavity slot document holder in the back panel described in previous embodiments. It should be noted that when this embodiment of the document holder is combined with any other embodiment including a lid, the lid may be sized and positioned to cover the document holder as well as the hollow receptacle chamber.

All ETC tag holders within the scope of this disclosure may include any combination of the finger slots, document holder, tag securing holes, drainage holes, lids, and different positions of the mounting holes disclosed herein. For example, an ETC tag holder according to one embodiment may have finger slots in the receptacle wall for the ETC tag and finger slots in the back panel for the document cavity, with mounting holes on the side. A tag holder according to an alternative embodiment may have a finger slot for the document holder only with mounting holes on top and no tag securing apertures. In yet another embodiment, the document holder, drainage holes and tag securing holes may all be left out of the design.

In the preceding specification, the invention has been described with reference to specific exemplary embodiments and examples thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. An ETC tag holder comprising:
    an open-top, hollow body of sufficient size to accommodate an ETC tag therein, the hollow body further comprising:
        a vertically planar back panel with an upper and lower end;
        a bottom surface extending outwardly from the panel at a substantially right angle;
        a receptacle wall extending upwardly from an outer edge of the bottom surface along its length, the receptacle wall not extending above the height of the back panel;
        a plurality of mounting apertures in the back panel extending from front to back.

2. The ETC tag holder of claim 1 further comprising means for securing the ETC tag.

3. The ETC tag holder of claim 2 wherein the means for securing the tag further comprises a number of tag securing apertures in the back panel at its left and right sides extending through the panel from front to back.

4. The ETC tag holder of claim 3 wherein the means for securing a tag in the holder further comprises an elastic band extending from the securing aperture in the left side of the panel to the securing aperture in the right side of the panel.

5. The ETC tag holder of claim 1 wherein the bottom surface further comprises drainage apertures.

6. The ETC tag holder of claim 1 wherein the hollow body is made of plastic.

7. The ETC tag holder of claim 6 wherein the plastic is lucite.

8. The ETC tag holder of claim 1 further comprising a slot-shaped cavity in the back panel top extending downwardly from the upper end to the lower end through at least a portion of the panel.

9. The ETC tag holder of claim 1 wherein the mounting apertures are disposed along the lower end.

10. The ETC tag holder of claim 1 wherein the mounting apertures are disposed along the upper end.

11. The ETC tag holder of claim 1 wherein the mounting apertures are disposed along a side of the panel.

12. The ETC tag holder of claim 1 wherein the means for mounting further comprises an engaging portion and a clamping portion, wherein the engaging portion is constructed and arranged to securely engage a bolting element passing through at least one of the mounting apertures, the bolting element bolting the panel to the engaging portion, and the clamping portion constructed and arranged to clamp onto a cylindrical motorcycle part.

13. The ETC tag holder of claim 1 wherein the receptacle wall further comprises at least one finger slot.

14. The ETC tag holder of claim 1 further comprising a lid constructed and arranged to cover the hollow receptacle chamber.

15. The ETC tag bolder of claim 14 further comprising fastening means for holding the lid in a closed position over the hollow receptacle chamber.

16. The ETC tag holder of claim 1 further comprising a left sidewall, a right sidewall, a second bottom surface, and a second panel interconnected with a backside of the back panel to form a document holder on the backside of the back panel.

17. The ETC tag holder of claim 1 further comprising:

a finger slot in an outer wall of the hollow body.

18. The ETC tag holder of claim 17 further comprising a document holder.

19. The ETC tag holder of claim 1 further comprising:

a lid constructed and arranged to cover the open-top of the hollow body.

20. The ETC tag holder of claim 19 further comprising a document holder.

* * * * *